United States Patent
Birkholz et al.

(10) Patent No.: US 10,403,997 B2
(45) Date of Patent: Sep. 3, 2019

(54) GUIDED PLUG CONNECTOR

(71) Applicant: VOSS AUTOMOTIVE GMBH, Wipperfürth (DE)

(72) Inventors: Thomas Birkholz, Gummersbach (DE); Jochem-Andreas Hess, Wipperfürth (DE); Tobias Etscheid, Lindlar (DE); Sascha Rosenfeldt, Wipperfürth (DE); Dietmar Boxberg, Köln (DE)

(73) Assignee: VOSS Automotive GmbH, Wipperfurth (DE)

( * ) Notice: Subject to any disclaimer, the term of this patent is extended or adjusted under 35 U.S.C. 154(b) by 0 days.

(21) Appl. No.: 16/083,396

(22) PCT Filed: Mar. 9, 2017

(86) PCT No.: PCT/EP2017/055599
§ 371 (c)(1),
(2) Date: Sep. 7, 2018

(87) PCT Pub. No.: WO2017/153545
PCT Pub. Date: Sep. 14, 2017

(65) Prior Publication Data
US 2019/0097340 A1    Mar. 28, 2019

(30) Foreign Application Priority Data

Mar. 10, 2016  (DE) .................. 10 2016 104 437
Sep. 13, 2016  (DE) .................. 10 2016 117 219

(51) Int. Cl.
*H01R 13/627*   (2006.01)
*H01R 13/00*    (2006.01)
(Continued)

(52) U.S. Cl.
CPC ............ *H01R 13/005* (2013.01); *F16L 25/01* (2013.01); *F16L 37/56* (2013.01); *H01R 13/5219* (2013.01); *F01N 2610/02* (2013.01)

(58) Field of Classification Search
CPC .... H01R 13/6272; H01R 13/58; H01R 13/59; H01R 13/516; H01R 13/506
(Continued)

(56) References Cited

U.S. PATENT DOCUMENTS 6,984,151 B2 *  1/2006  Wu ................... H01R 9/032
                                                         439/352
7,618,291 B2    11/2009 Standke
(Continued)

FOREIGN PATENT DOCUMENTS

DE       20318581 U1    4/2005
DE    102005046040 A1   4/2007
(Continued)

*Primary Examiner* — Phuong Chi T Nguyen
(74) *Attorney, Agent, or Firm* — Eric J. Sosenko; Jonathan P. O'Brien; Honigman LLP

(57) ABSTRACT

A multi-line plug connector for connecting two heated fluid lines by way of a single connecting operation, including a female plug component which is connected with a male plug component. Each plug component includes a fluid connection and two electrical connections. Each plug component also includes an inner space in which a spectacle component is housed. The spectacle component has two guide channels for receiving electrical lines equipped with electrical contacts. The guide channels are connected with one another by a bridge that is fastened with a latching mechanism that secures the spectacle component against displacement along and/or obliquely to the coupling axis. The spectacle component receives a tubular fluid connector, connected with the spectacle component with form-fit and/or friction-fit, whereby the tubular fluid connector can be connected on one
(Continued)

end to the heated fluid line and on the opposite end the fluid connector.

29 Claims, 11 Drawing Sheets

(51) Int. Cl.
    *F16L 25/01*     (2006.01)
    *F16L 37/56*     (2006.01)
    *H01R 13/52*     (2006.01)

(58) Field of Classification Search
    USPC .......................................... 439/352, 460–465
    See application file for complete search history.

(56) References Cited

U.S. PATENT DOCUMENTS

| | | | |
|---|---|---|---|
| 7,686,634 | B2 | 3/2010 | Trimborn et al. |
| 8,113,869 | B2 * | 2/2012 | Su .................... H01R 13/5816 439/455 |
| 9,543,697 | B2 * | 1/2017 | Nakashima .......... H01R 13/641 |
| 9,728,890 | B2 * | 8/2017 | Nakai .................... H01R 13/52 |
| 2003/0236017 | A1 * | 12/2003 | Waddell ............. H01R 13/6275 439/352 |
| 2016/0072226 | A1 * | 3/2016 | Puhl .................. H01R 13/6273 439/352 |

FOREIGN PATENT DOCUMENTS

| | | |
|---|---|---|
| EP | 0821444 A2 | 1/1998 |
| EP | 1538708 A2 | 6/2005 |
| EP | 2463566 A1 | 6/2012 |
| WO | 2007/017023 A1 | 2/2007 |

* cited by examiner

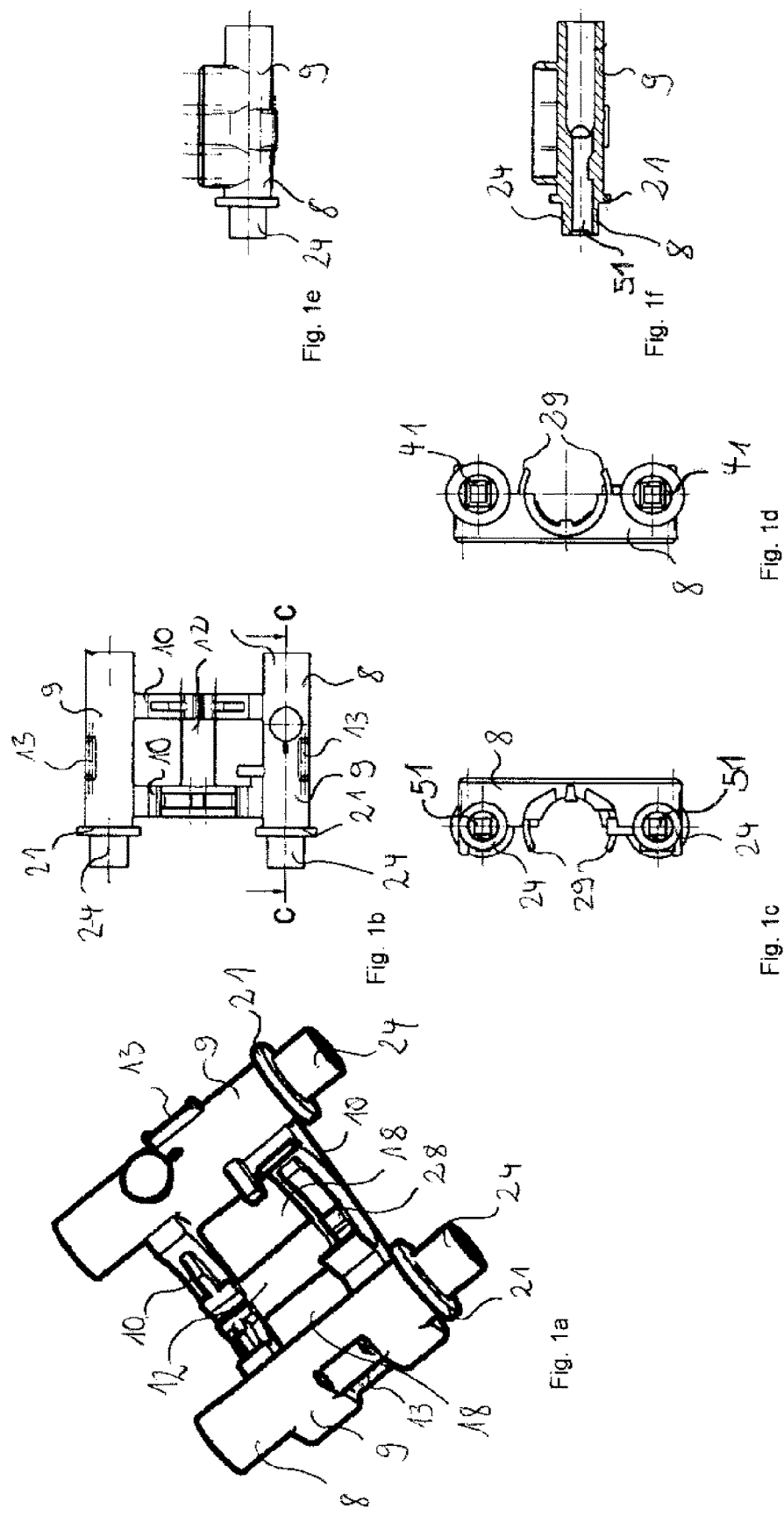

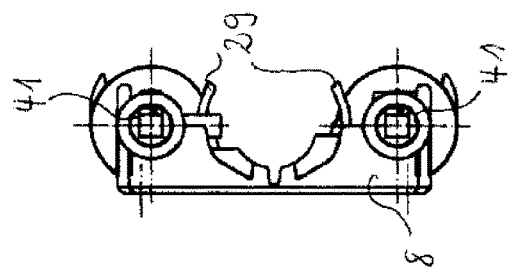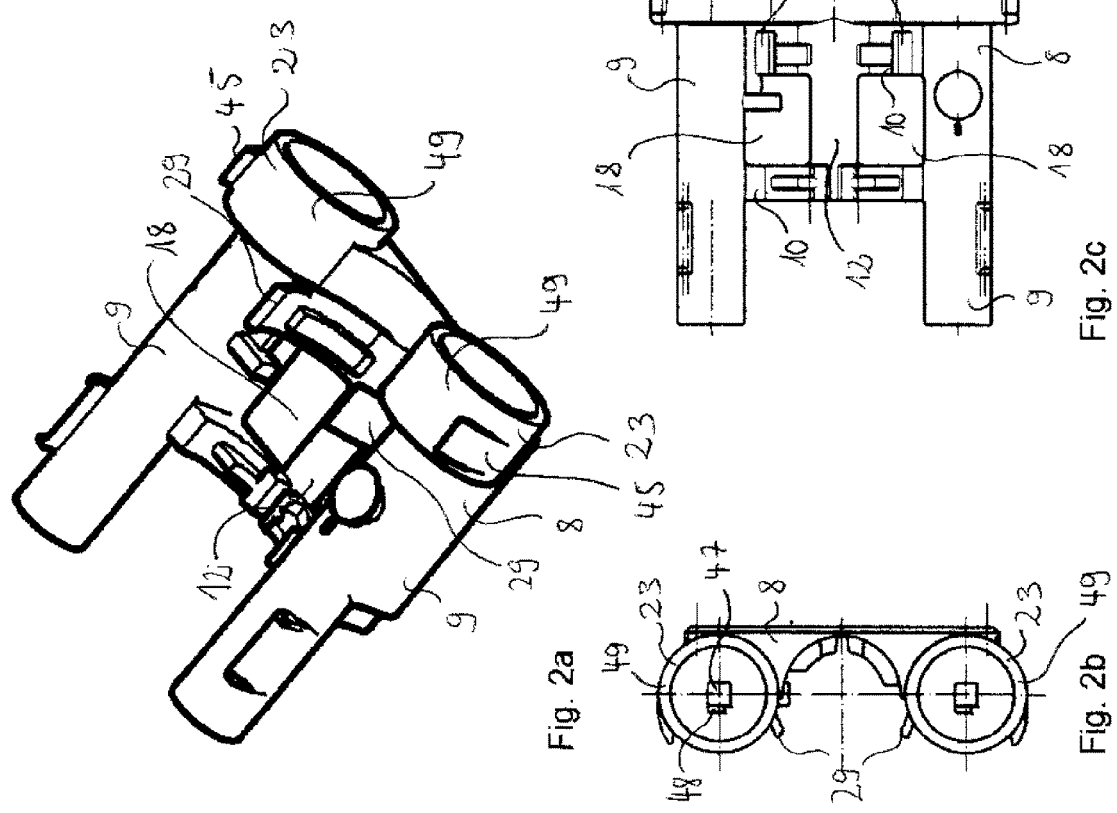

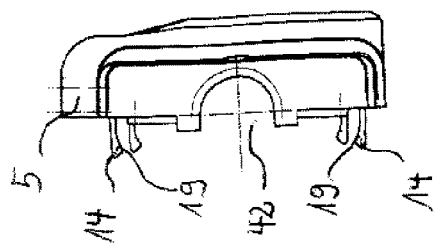
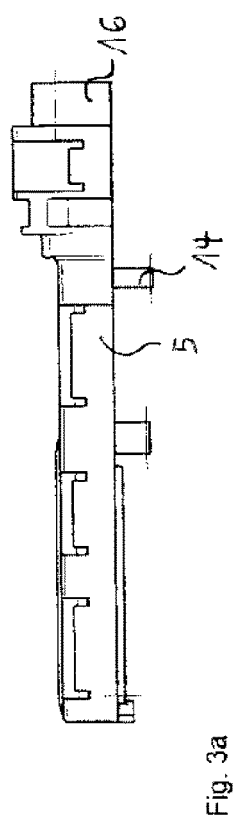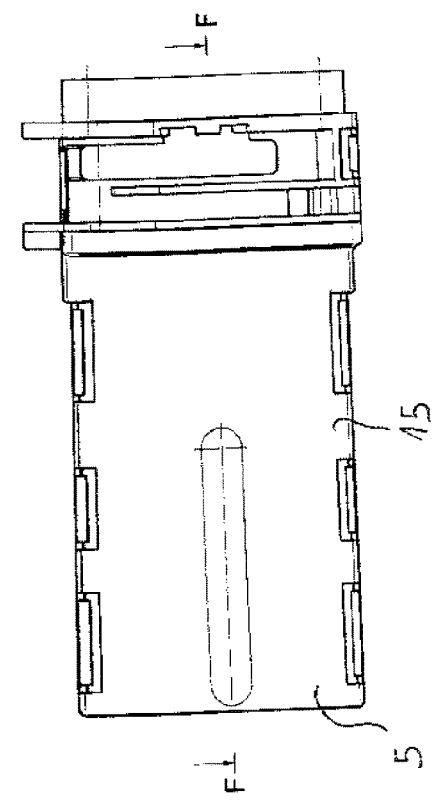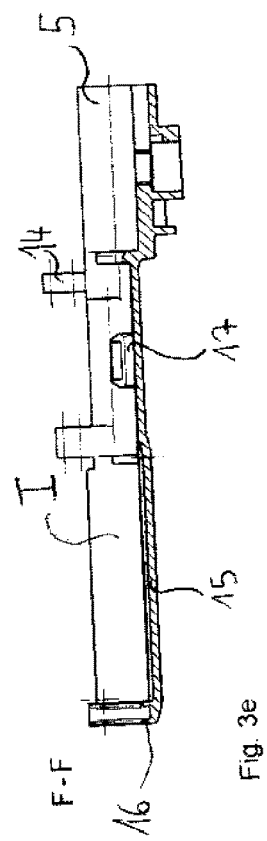
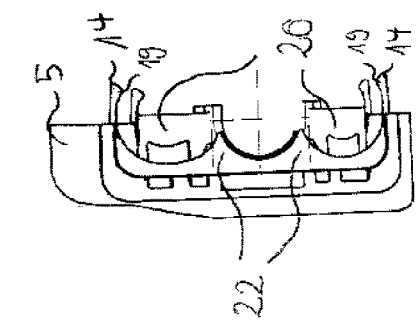

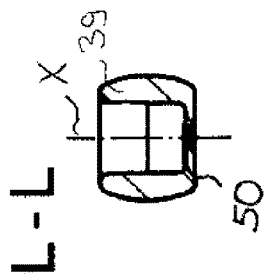
Fig. 7g
Fig. 7h
L-L Fig. 7i
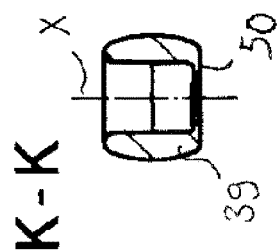
Fig. 7d
Fig. 7e
K-K Fig. 7f
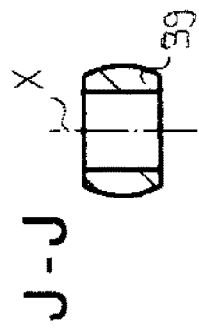
Fig. 7a
Fig. 7b
J-J Fig. 7c

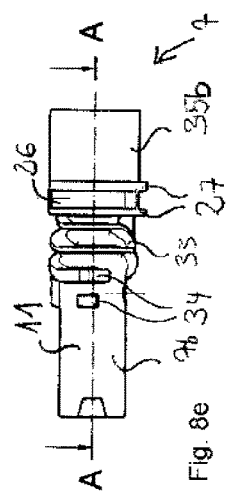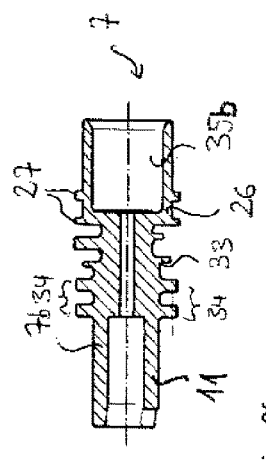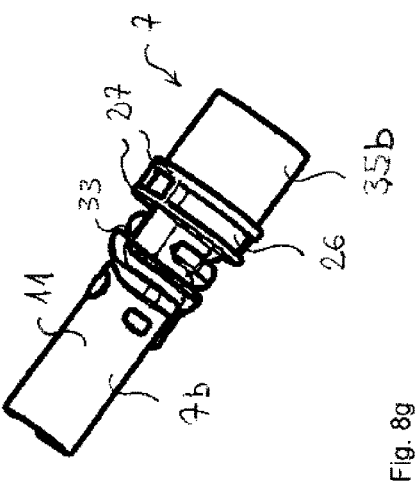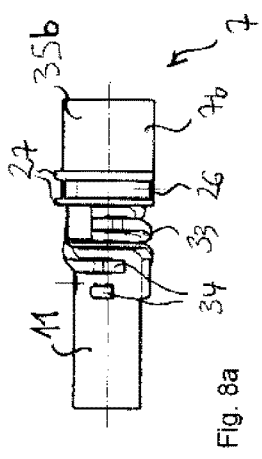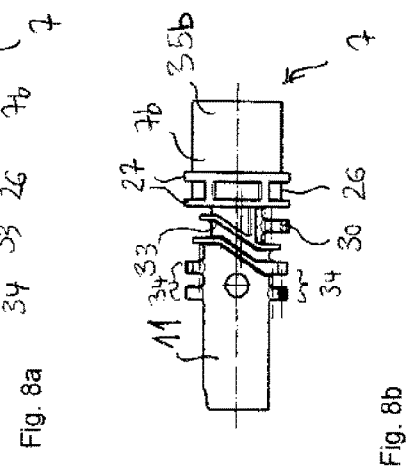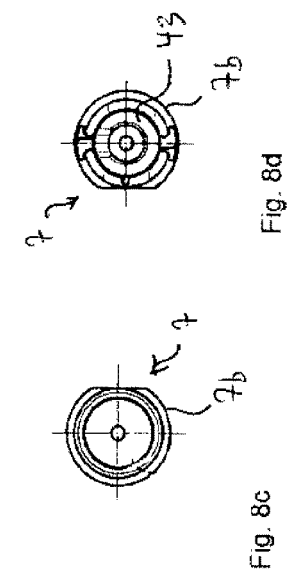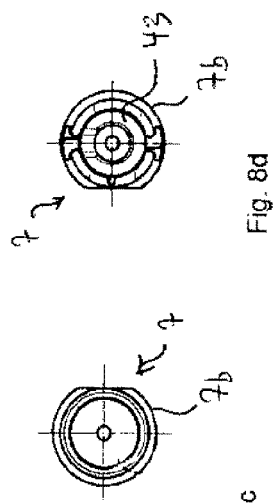

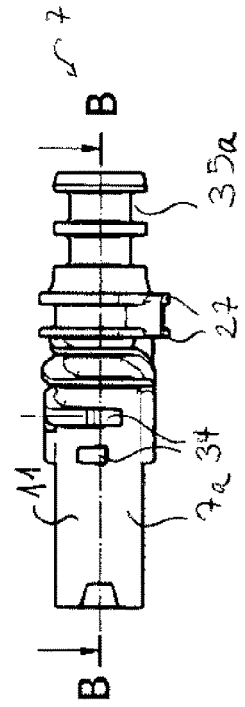
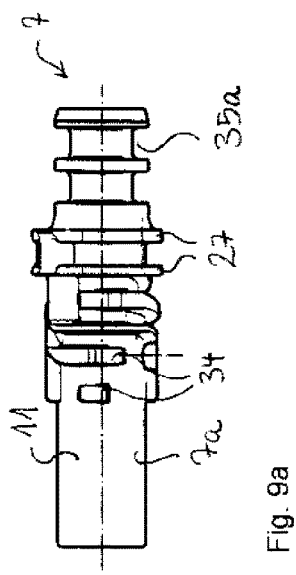
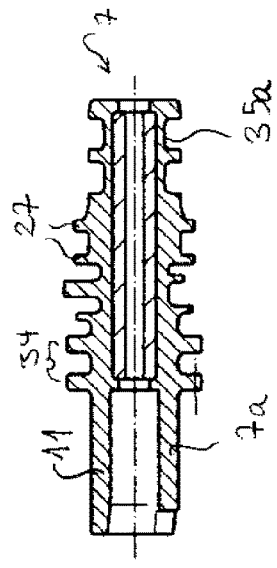
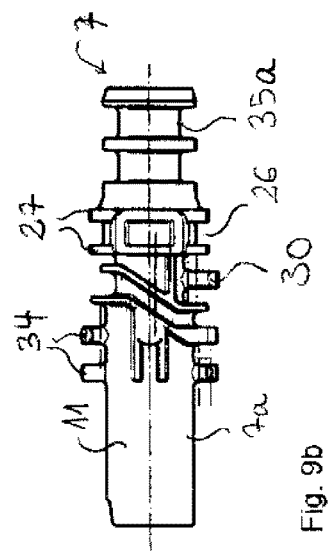
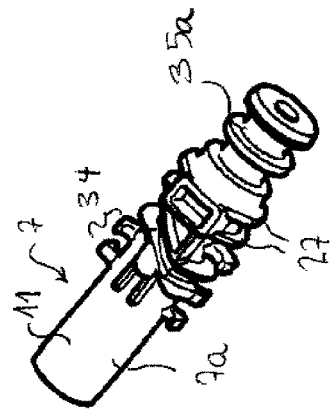
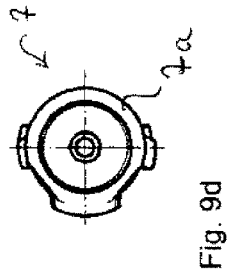
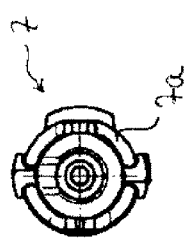

GUIDED PLUG CONNECTOR

BACKGROUND

1. Field of the Invention

The invention concerns a multi-line plug connector for connecting two heated fluid lines and at least two electrical lines by way of a single plugging operation, including a female plug component which is releasably connected with a male plug component along a coupling axis in a plugged-in state, wherein each plug component includes a fluid connection and two electrical connections.

2. Description of Related Art

The invention is based on the problem to make available a multi-line plug connector of the previously described type which is still functional with the increase of fluid pressure effected by temperature changes, especially under the influence of ice pressure.

SUMMARY

This problem is met by a multi-line plug connector which is characterized in that each plug component includes a two-part plug housing made of a base component and a cover component which can be connected to one another and enclose an inner space, in which a spectacle component is contained, wherein the spectacle component includes two guide channels extending along the coupling axis for the purpose of accepting electrical lines and the electrical connectors on their ends, and the guide channels are connected with one another by way of at least one bridge, wherein the bridge is connected to a latching mechanism of the base component protruding into the inner space either by friction-fit and/or form-fit, so that the spectacle component is secured on the base component against displacement along and/or perpendicular to the coupling axis.

In particular it is provided that the spectacle component incorporates a fluid connector, preferably tubular in shape, which is connected with the spectacle component by friction-fit and/or form-fit to prevent displacement along the coupling axis, wherein the fluid connector includes a connecting component on one end for connection to the heated fluid line, and the respective fluid connection is formed on the end opposite the connecting component. The separate formation and assembly of the fluid connector has the advantage that the plug connector can tolerate a higher fluid pressure/ice pressure in its connected condition than a plug connector of the initially described type, which is assembled from fewer individual parts.

The spectacle component is preferably secured to the base component and/or the cover component with form-fit in the area of the electrical connections to protect against displacement along the coupling axis. There is a particular advantage when the electrical connections and the fluid connection of each plug component are formed separately from one another, as this results in that less of the force generated by fluid pressure in the fluid connections is transferred to the electrical connections by way of the plug connector.

Preferably one of the plug components includes a circumferential collar in an axial position to the coupling axis extending over the fluid connection and the electrical connections. This collar allows the other plug component to be inserted into the plug component including the collar at a predetermined tilt angle of no more than 8°, particularly no more than 4°, in relation to the coupling axis. This increases the coupling reliability, particularly that of the electrical connections.

In particular it is provided that a window on the electrical contact socket and the electrical contact pins are oriented to one another in such a way that coupling reliability of the electrical contacts is ensured despite an inclined orientation—determined by the design—of the electrical contact pins to the electrical contact sockets in a range from 4° to 8° in respect to the coupling axis X.

It is particularly preferred that when joining the plug components in their connected state with separation between the two plug components, wherein the collar of the female plug component receives the electrical connections of the male plug component, each window of an electrical contact socket of a female electrical connection is radially offset to the electrical contact pins of the male plug component to be inserted into the electrical contact socket on a cylindrical circumferential surface in relation to a central axis running through the middle of the electrical contact socket of the female electrical connection, particularly at 180°. It is especially preferred in the previously described arrangement of the plug components for joining in their connected state that every window of the electrical contact socket is radially offset to the electrical contact pin to be inserted into the electrical contact socket on a cylindrical circumferential surface of a central axis running through an inlet opening in the electrical contact socket, particularly at 180°. The electrical contact pins of the male electrical connections are hereby already facing away from the window which is located directly next to the inlet opening of the electrical contact socket upon joining of the plug components in their connected state. This has the advantage that the electrical contact pins cannot be inserted into the window next to the electrical contact socket. If the electrical pins should be oriented at an angle of 4° to 8° to the coupling axis due to the design, it can still be ensured that the tips of the electrical contact pins always point away from the windows of the electrical contact sockets, at least offset by 180° to the windows on the circumferential surface of the central axis of the electrical contact socket. Additionally it is preferable that the collar on the female plug component is formed in such a way that the electrical contact pins cannot enter the windows of the electrical contact sockets under any circumstances upon joining of the plug components. In summary, the coupling reliability of the electrical contacts is hereby ensured.

Preferably, the female electrical connection is surrounded by a sealing element on its outer circumference, particularly by a barrel-shaped sealing ring, whereby the sealing element is affixed to the outer circumference of the female electrical connection by friction-fit and/or form-fit. In particular it is provided that the sealing element exhibits a width along the coupling axis such that it protrudes axially to the coupling axis over the electrical contact socket of the female electrical connection when placed on the collar-shaped protrusion, and the sealing element lies in contact with the collar-shaped protrusion of the female electrical connection and the respective male electrical connection with a clamping force acting axially long the coupling axis when in its connected state. This prevents play between the two plug components in their connected state. This constitutes an advantage in that the electrical contacts of the electrical connections in their connected state cannot rub against one another, and thus the jumping of sparks between the electrical contacts is prevented.

Preferably, the sealing element includes a ring-shaped annular projection on its outer surface, which surrounds the sealing element along its whole circumference with respect to the coupling axis, wherein the annular projection is designed in such a way that it bridges a radial gap between the spectacle component and the sealing element. This preferred design has the advantage that the sealing element generates a seal even without axial preload, by this sealing element sealing radially. Furthermore, relative motion between the electrical contacts, for example caused by vibrations, are prevented.

BRIEF DESCRIPTION OF THE DRAWINGS

Advantageous design forms of the invention are explained in the description and illustrated by the drawings.

FIG. 1a shows a perspective view of a first spectacle component according to the invention, FIG. 1b shows a top view of the first spectacle component according to the invention, FIG. 1c shows an end view of female electrical connections of electrical lines in guide channels for the electrical lines of the first spectacle component according to the invention, FIG. 1d shows an end view of insertion openings of the guide channels for electrical lines of the first spectacle component according to the invention, FIG. 1e shows a side view of the first spectacle component according to the invention, FIG. 1f shows a cross-section through a guide channel of the first spectacle component according to the invention, generally along line C-C of FIG. 1b, FIG. 2a shows a perspective view of a second spectacle component according to the invention, FIG. 2b shows a top view of male electrical connections of electrical lines in guide channels for the electrical lines of the first spectacle component according to the invention, FIG. 2c shows an end view of the second spectacle component according to the invention, FIG. 2d shows an end view of insertion openings of the guide channels for electrical lines of the second spectacle component according to the invention, FIG. 3a shows a side view of a base component for a female plug component according to the invention, FIG. 3b shows an end view of recesses in the base component for a female plug component according to the invention, FIG. 3c shows a top view of the base component for a female plug component according to the invention, FIG. 3d shows an end view of a feed-through opening in the base component for a female plug component according to the invention, FIG. 3e shows a cross-section, generally along line F-F in FIG. 3c, through the base component for a female plug component according to the invention, FIG. 7a shows a perspective view of a first design example of a barrel-shaped seal, FIG. 7b shows an end view of the first design example of the barrel-shaped seal, FIG. 7c shows a cross-section through the barrel-shaped seal according to the first design example generally along line J-J in FIG. 7b, FIG. 7d shows a perspective view of a second design example of a barrel-shaped seal, FIG. 7e shows and end view of the second design example of the barrel-shaped seal, FIG. 7f shows a cross-section through the barrel-shaped seal according to the second design example generally along line K-K in FIG. 7e, FIG. 7g shows a perspective view of a third design example of a barrel-shaped seal, FIG. 7h shows an end view of the third design example of the barrel-shaped seal, FIG. 7i shows a cross-section through the barrel-shaped seal according to the third design example generally along line L-L in FIG. 7h, FIG. 8a shows a first view of a female fluid connector according to the invention, FIG. 8b shows a second view of the female fluid connector according to the invention, FIG. 8c shows an end view of a receiving area of the female fluid connector, FIG. 8d shows an end view of a connecting opening of the female fluid connector, FIG. 8e shows a third view of the female fluid connector according to the invention, FIG. 8f shows a cross-section through the female fluid connector t generally along line A-A in FIG. 8e, FIG. 8g shows a perspective view of the female fluid connector, FIG. 9a shows a first view of a male fluid connector according to the invention, FIG. 9b shows a second view of the male fluid connector according to the invention, FIG. 9c shows an end view of a mating area of the male fluid connector, FIG. 9d shows an end view of a connecting opening of the male fluid connector, FIG. 9e shows a third view of the male fluid connector according to the invention, FIG. 9f shows a cross-section through the male fluid connector generally along line B-B in FIG. 9e, FIG. 9g shows a perspective view of the male fluid connector.

Identical parts are always marked with the same reference numerals in the various Figures of the illustrations.

DETAILED DESCRIPTION

For the following description it is to be noted that the invention is not restricted to the design examples and therefore not to all or multiple features of the described feature combinations; furthermore, every individual partial feature of each and every design example is also meaningful for the object of the invention separately from all other partial features described in combination, and also in combination with any features of another design example.

Figure 5:
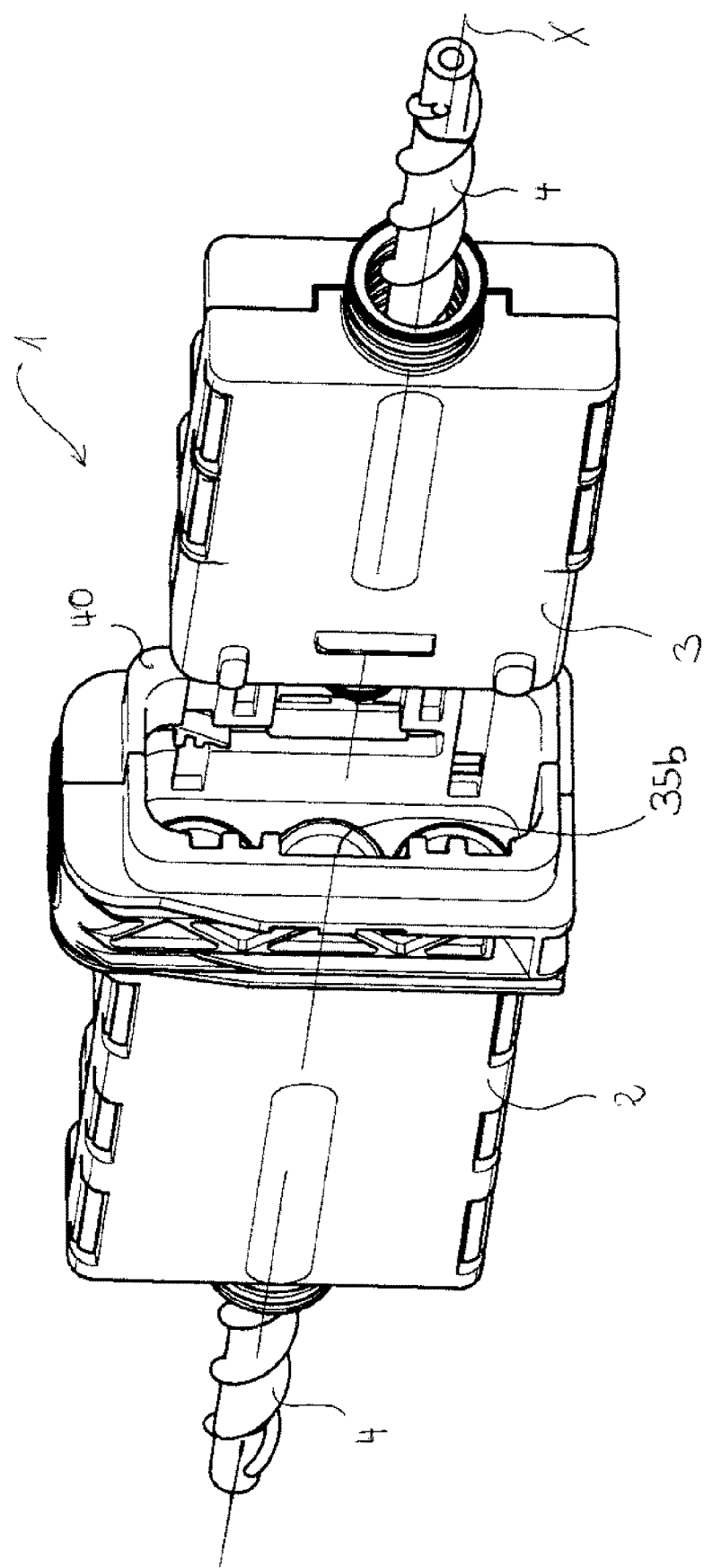
FIG. 5 shows an exploded view of a multi-line plug connector according to the invention from a first perspective.
Figure 6:
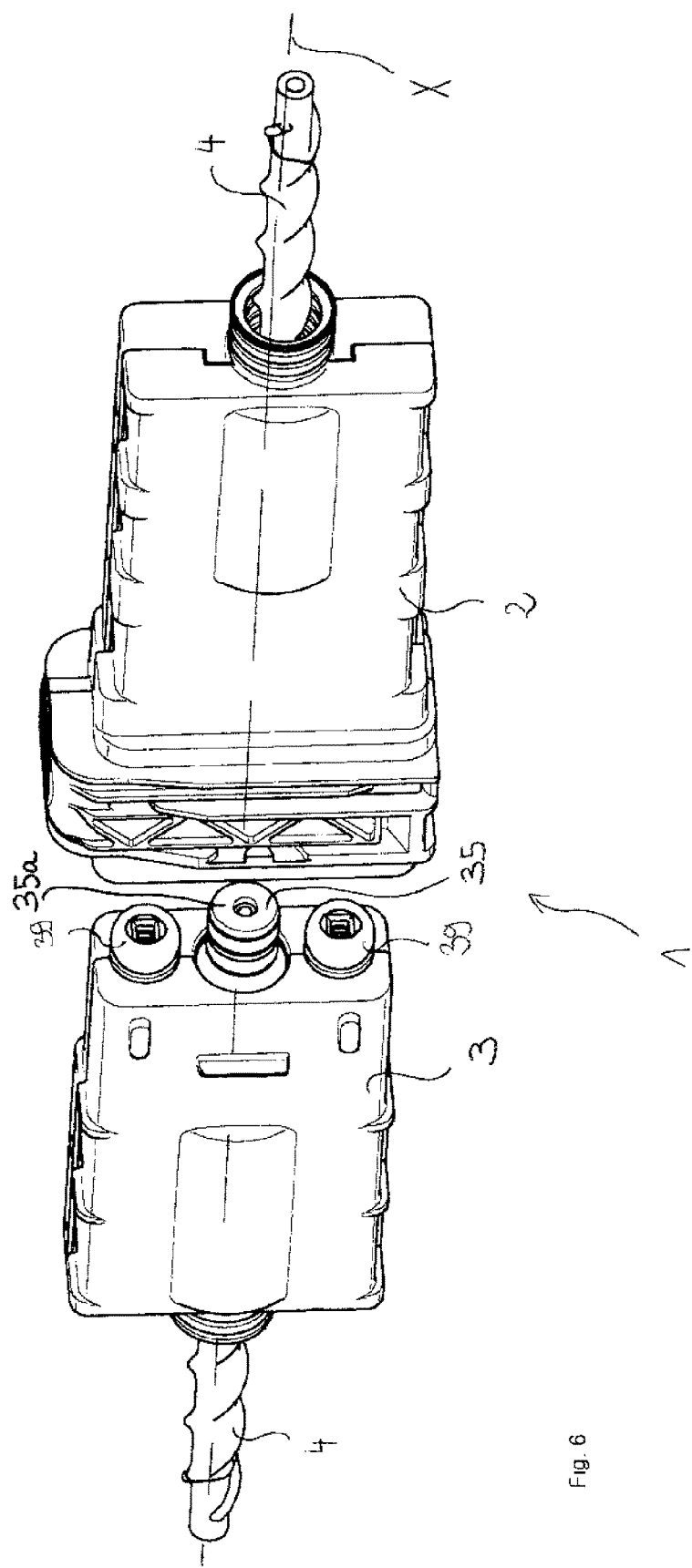
FIG. 6 shows an exploded view of a multi-line plug connector according to the invention from a second perspective.

FIGS. 5 and 6 show a multi-line plug connector 1 according to the invention, comprising a female and a male plug component. The multi-line plug connector 1 serves to connect two fluid lines and at least two electrical lines or heating lines in a single connecting operation. Particularly favorably, the multi-line plug connector 1 is ideal for connecting four electrical lines and two fluid lines in a single connecting operation. The multi-line plug connector 1 is ideal for connecting two SCR lines 4, wherein the SCR lines 4 are heated, and wherein the electrical lines for heating the SCR line 4 are also connected via the multi-line plug connector 1. The male plug component 3 can be introduced into the female plug component 2 in a coupling direction along a coupling axis X, and can be separated from the female plug component 2 along the coupling axis X.

Each plug component 2, 3 has a plug housing with a base component 5 and with a cover component 6 which can be latched to the base component 5. It is preferable that the cover component 6 can be attached to the base component 5 along an assembly axis which runs perpendicular to the coupling axis X. In an inner space I of the plug housing, which is enclosed at least by the base component 5, each plug component 2, 3 incorporates a fluid connector 7, which is incorporated into a spectacle component 8 with two guide channels 9, each for one electrical line. When all aforementioned components are incorporated into the plug housing, the plug housing can be closed by connecting the cover component 6 with the base component 5.

The spectacle component 8 includes two, specifically tubular, guide channels 9, through which either an electrical line with an electrical contact socket of a female electrical connection 24 or an electrical contact pin of a male electrical connection 23 can be passed; see FIGS. 1a to 1f and 2a to 2d. Additionally, the electrical contact pin or the electrical contact socket can be connected with the guide channels 9, preferably with a latching mechanism with a corresponding opposite latching mechanism within the guide channels 9. In particular it is provided that, in the installed state of the electrical contact socket or the electrical contact pin, a window 48 in the electrical connection 23, 24 extends along the coupling axis X along with the electrical contact socket or the electrical contact pin. The window 48 ends in an inlet opening 51 of the electrical connection 23, 24. The window 48 forms, for example, an undercut for a retaining lug for the electrical contact socket or the electrical contact pin. Thus the electrical contact socket or the electrical contact pin is secured in the guide channels 9 of the spectacle component 8 against displacement along the coupling axis X, specifically being latched with the window 48.

Particularly, the electrical lines have a seal (not shown) at the connection to the electrical contact pin or the electrical contact socket, which lies within the guide channel 9 in a fluid-tight condition.

The longitudinal axes of the tubular guide channels 9 stretch along—specifically, parallel to—the coupling axis X within the plug housing of the plug component 2, 3. The longitudinal axes of a body, for example the longitudinal axes of the guide channels 9, always run along the direction of a body in which the body has the largest expanse.

The guide channels 9 are connected to one another at least by way of a bridge 10 which runs crosswise—preferably perpendicularly—to the coupling axis X. Preferably, the—specifically tubular—guide channels 9 are connected to one another by two bridges 10 which run perpendicularly to the coupling axis X. In particular, the bridges 10 are formed as one piece with the guide channels 9.

In particular, cross-bars 12 are located between the bridges 10, whose longitudinal axes run along, preferably parallel to, the coupling axis X crosswise to the bridges 10. Preferably, the bridges 10 are formed as one piece with the cross-bars 12. In particular, the spectacle component 8 comprises at least two cross-bars 12. Particularly preferably, each cross-bar 12 runs crosswise with its longitudinal axis to two ends of the bridges 10 and connects these ends of the bridges 10 with each other (not shown). The cross-bars 12 which each run along the ends of the bridges 10, preferably run beneath the—specifically tubular—guide channels 9 on a side which faces the base component 5. In particular, an additional cross-bar 12 is located centrally between the two side cross-bars 12, which connects the bridges 10 to each other; see FIGS. 1a, 1b, 2a, and 2c.

On the cross-bars 12 which run along the ends of the respective bridges 10, it is preferable that a notch 13 is formed on the side facing away from the other cross-bar 12 (not shown on the cross-bars 12). As is shown in FIG. 1a or 1b, the notch 13 can stretch all the way to the guide channels 9 and along their outer surfaces. Alternately, the guide channels 9 can also be formed without a notch, such as in FIG. 2a for example. The notch 13 advantageously guides the spectacle component 8 between tabs 14 of the base component 5 upon insertion of the spectacle component 8 into the base component 5 (see FIGS. 3a, 3d, 3e). In this way, the spectacle component 8 can be more easily brought into a correct assembly position within the base component 5.

The base component 5 of the plug housing comprises at least one support plate 15, which runs in a plane along the coupling axis X; see FIGS. 3a to 3e for example. It is preferable that the support plate 15 is bordered by a continuous frame 16, so that the inner space I is designed to accept the spectacle component 8 and the fluid connector 7. The continuous frame 16 is developed as one piece with the support plate 15. The cover component 6 can be developed in a corresponding manner; see FIGS. 4a to 4e.

The base component 5 includes various locking mechanisms for locking the spectacle component 8 in place within the inner space I. The base component 5 has—specifically rectangular—protrusions 17 on the support plate 15, which point into the inner space I of the base component 5. The protrusions 17 can have a form-fit into openings 18 in the spectacle component 8; see FIGS. 1a, 1b, 2a, and 2c. Additionally the base component 5 has elastic tabs 14 which are formed on the sides of the base component 5 and point away from the support plate 15 of the base component 5. The spectacle component 8 can be clamped between the tabs 14. To this end, the tabs 14 have lobes 19, preferably on their ends farthest from the base component 5 (see FIGS. 3b and 3d), which overlap the spectacle component 8, particularly on the outer circumference of the guide channels 9, in a latching manner.

Furthermore, the base component 5 comprises recesses 20 (see FIG. 3b) which grab behind the radial collar-shaped projections 21 (see FIG. 1a) of the guide channels 9 of the electrical lines, whereby specifically the collar-shaped projections 21 are formed on the circumference of the guide channels 9, preferably around the whole circumference of the tubular guide channels 9. The contour of the recesses 20 is specifically adapted to the outer contour of the tubular guide channels 9.

In particular, teeth 22 are formed between the recesses 20 of the base component 5 (see FIG. 3b), on which the spectacle component 8 rests in a form-fit manner, preferably with a bridge 10 adjacent to the projections 21 of the guide channels 9. Together with the recesses 20, the teeth 22 of the base component 5 secure the spectacle component 8 against longitudinal displacement along the coupling axis X. The teeth 22 of the base component 5 engage between the circumferential collar-shaped projections 21 of the guide channels 9 of the spectacle component 8 and a bridge 10 of the spectacle component 8. The projections 21 of the guide channels 9 lie preferably on an outer wall of the base component 5 and/or the cover component 6 in the installed state of the spectacle component 8.

The cross-bars 12 and bridges 10 are arranged at a distance from one another, whereby the openings 18 are formed between them. When the spectacle component 8 is inserted into the base component 5, at least one protrusion 17 of the base component 5 engages positively with at least one opening 18 of the spectacle component 8. In this way, the spectacle component 8 is secured with form-fit within the base component 5 against longitudinal displacement along the coupling axis X.

The—specifically tubular—guide channels 9 of the spectacle component 8 each have an electrical connection 23, 24. In the area of each electrical connection 23, 24 there is contact between an electrical contact pin with an electrical contact socket upon connection of the plug components 2, 3. Thus each female electrical connection 24 includes a single electrical contact socket and each male electrical connection 23 includes a single electrical contact pin. In the case of the female electrical connections 24 (see FIGS. 1a and 1b), in particular around the whole circumference of the tubular guide channels 9, the radial collar-shaped projection 21 is formed, which peripherally surrounds the plug housing of the plug component 2, 3 on the base component 5 and/or on the cover component 6 in the area of the recesses 20, as previously described.

In the case of the male electrical connections 23, a hollow cylindrical receiving body 49 is provided (see for example FIG. 2a or FIG. 2b), within which the electrical contact pins extend longitudinally along the coupling axis X. The hollow cylindrical receiving body 49 of the male electrical connections 23 receives the corresponding female electrical connection 24, including its electrical contact socket, around its whole circumference when plug components 2, 3 are in their connected state. To this end, the outer diameter of the female electrical connection 24 is smaller than the inner diameter of the hollow cylindrical receiving body 49 of the male electrical connection 23 (see for example FIGS. 1a and 2a).

The fluid connector 7 can be inserted into the spectacle component 8. The fluid connector 7 is preferably tubular in shape. In particular, the fluid connector 7 can be connected between the two, preferably tubular, guide channels 9 with the spectacle component 8 with form-fit and/or friction-fit and/or a material bond, for example by 2-component injection molding, preferably latchable, especially preferably by clamping.

The fluid connector 7 is preferably formed as a cylinder with a channel (not shown), whereby the channel extends along the coupling axis X and is open on both sides, see FIGS. 8a to 8g as well as 9a to 9g. In particular the fluid connector 7 includes a connecting component 11 on one end for connecting to the heated fluid line, and a fluid connection 35, 35a, 35b is formed on the opposite end from the connecting component 11. The fluid connector 7 has a circumferential groove 26 in a first section, which is formed by two annular projections 27 which run axially next to one another around the whole circumference of the fluid connector 7. It is especially preferable that the fluid connector 7 can be connected by way of these annular projections 27 with the spectacle component 8 in a friction-fitting or form-fitting manner, preferably able to be clamped radially in the spectacle component 8.

When the fluid connector 7 is mounted in the spectacle component 8, the fluid connector 7 receives a projection 28 within the trough of the circumferential groove 26, which is formed on one of the cross-bars 12, preferably on the middle cross-bar 12 (not shown). This prevents longitudinal displacement of the fluid connector 7 within the spectacle component 8. For a friction-fit or form-fit connection of the fluid connector 7 with the spectacle component 8, clamping arms 29 are provided (see FIGS. 1c, 1d, 2a to 2d), which are formed on the spectacle component 8 between the tubular fluid channels [sic] 9, and which lie radially clamped on the annular projections 27. The clamping arms 29 preferably envelope the fluid connector 7 on its outer circumference over a circumferential area larger than 180°.

Thus the fluid connector 7 is secured against movement obliquely to the coupling axis X and along the coupling axis X.

The fluid connector 7 is additionally secured against undesirable displacement due to forces acting obliquely to the coupling axis X by the cover component 6, which closes the base component 5.

Figure 4D:
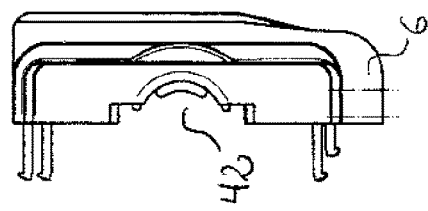
FIG. 4d shows an end view of a feed-through opening in the cover component for a female plug component according to the invention.
Figure 4A:
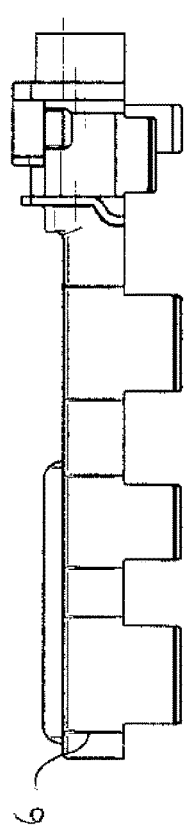
FIG. 4a shows a side view of a cover component for a female plug component according to the invention.
Figure 4C:
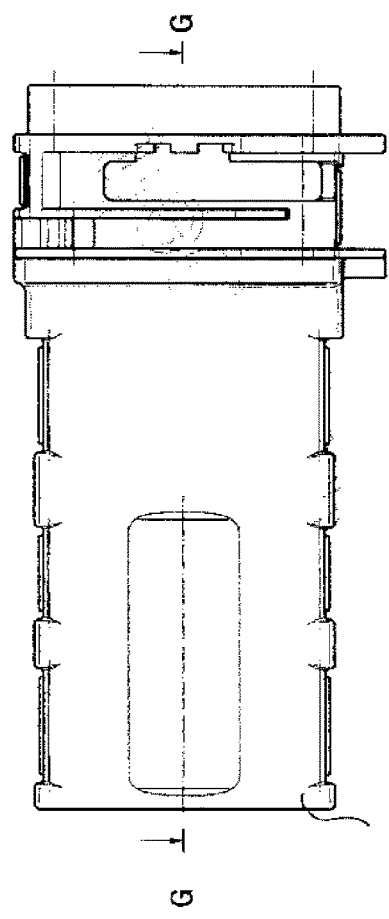
FIG. 4c shows a top view of the cover component for a female plug component according to the invention.
Figure 4B:
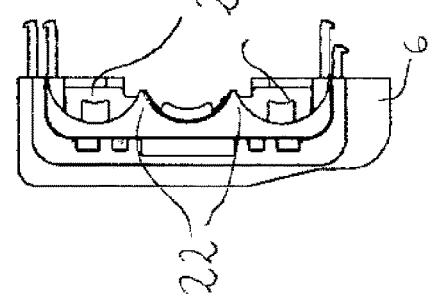
FIG. 4b shows an end view of recesses in the cover component for a female plug component according to the invention.
Figure 4E:
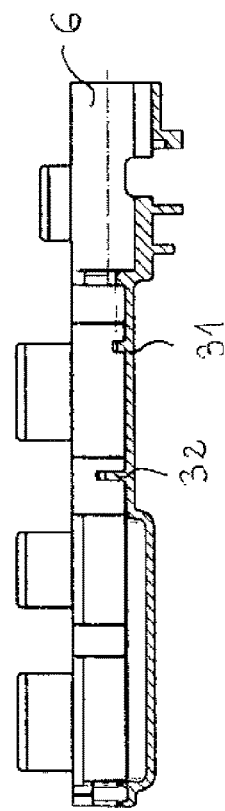
FIG. 4e shows a cross-section, generally along line G-G in FIG. 4c, through the cover component for a female plug component according to the invention.

In particular, the cover component 6 comprises a retaining collar 31 for securing the fluid connector 7, see FIG. 4e, which protrudes into the inner space I of the plug housing. The retaining collar 31 is located in the groove 26 of the fluid connector 7 between the annular projections 27 when the cover component 6 is in place. In particular, the retaining collar 31 of the cover component 6 engages with a radial offset in the groove 26 on an outer circumference of the fluid connector 7, preferably by 180°. Thus the fluid connector 7 is secured against rotation around its own longitudinal axis along the coupling axis X within the completely assembled plug housing. A first retaining rib 32, which also protrudes into the inner space I of the plug housing, is preferably located on the cover component 6 along the coupling axis X offset to the retaining collar 31. The first retaining rib 32 extends crosswise to the fluid connector 7 when the cover component 6 is in place.

The first retaining rib 32 is specifically adapted in its contour to the outer contour of the fluid connector 7, so that the first retaining rub 32 lies on the outer circumference of the fluid connector 7 when the cover component 6 is in place.

In particular, the cover component 6 has two retaining ribs (not depicted) corresponding to each tubular guide channel 9, which are adapted in contour to the contour of the guide channels 9. These two retaining ribs, like the first retaining rib 32 of the fluid connector 7, also lie in contact with the guide channels 9 of the electrical lines when the cover component 6 is in place. In this way, the spectacle component 8 is secured against displacement crosswise to the coupling axis X in the plugs 2, 3.

The retaining collars 31 and the retaining ribs 32 of the cover component 6 advantageously exert a retaining force upon the spectacle component 8 in the direction of the base component 5, so that the spectacle component 8 is secured between the cover component 6 and the base component 5 against tipping in relation to the coupling axis X.

Like the base component 5 of the male plug component 3, the cover component 6 of the male plug component 3 preferably has recesses 20 for gripping the radial collar-shaped projections 21 of the guide channels 9 of the electrical lines. The radial collar-shaped projections 21 here work with the recesses 20 in the same fashion as described for the base component 5. In the case of the female plug component 2, a corresponding design or a latching of the electrical connection 23, 24 with the plug housing can be provided. As can be seen in FIG. 2a for the spectacle component 8 of the female plug component 2, the male electrical connection 23 can include latching protrusions 45 which work together with corresponding negative latching spaces in the plug housing, whereby the spectacle component 8 is held in the plug housing against displacement along the coupling axis X.

In particular, the spectacle component 8 is secured with form-fit to the plug housing in the area of the electrical connections 23, 24, especially preferably only on the base component 5, against displacement along the coupling axis X. In particular, the spectacle component 8 is circumferentially enclosed by the base component 8 on its male electrical connection 23 in such a way that it is secured against displacement along the coupling axis X on the base component 5.

The fluid connector 7 preferably has contours 33 on its outer circumference for guiding the electrical lines, wherein the contours 33 are formed in such a way that the electrical lines can be wound around the fluid connector 7 at least once; see for example FIGS. 8a, 8b, or 9a and 9b. Offset axially to the contours 33, the fluid connector 7 comprises specifically two deflecting extensions 34 radially offset to one another, in particular at 180° on the outer circumference of the fluid connector 7. The deflecting extensions 34 advantageously serve to guide the electrical lines and are specifically designed in such a way that the electrical lines can be guided away from the fluid connector 7 at the same end of the fluid connector 7. Furthermore, a male fluid connector 7a has a male fluid connection 35a with a mating area upon which O-rings can be affixed on its outer circumference (see FIG. 6), whereby the mating area can be inserted into a female receiving area of a female fluid connector 35b of a female fluid connector 7b which is designed to receive it.

Especially an oblique protrusion 30 abuts the contours 33 for guiding the electrical lines, which is axially offset to the annular projections 27. The oblique protrusion 30 serves to brace the fluid connector 7 on the spectacle component 8. Thus it lies together with the annular projections 27 on the spectacle component 8 and thereby braces the fluid connector 7 together with the annular projections 27 against axial tilt along the coupling axis X. The oblique protrusion 30 is advantageous for assembling the plug component 2, 3, for example so that the fluid connector 7 does not tilt as easily when the cover component 6 is placed on the base component 5.

The cover component 6 and the base component 5 can be connected to one another by a latching mechanism. Preferably all components of the multi-line plug connector 1 are made of plastic and preferably fiberglass reinforced. In particular, all components of the multi-line plug connector are injection molded. For example, the components of the multi-line plug connector can be made of PPA or PPT. The fluid connector 7 can be made of metal or thermally conductive plastic. In particular, the fluid connector 7 consists of two components. For example, the fluid connector 7 can be manufactured by a two-component injection molding process. Preferably, the channel of the fluid connector 7 is made from a thermally conductive material. For example, the fluid connector 7 can include a thermally conductive sleeve which is installed in the channel of the fluid connector 7. The thermally conductive sleeve is preferably made of metal.

The order of assembly of the multi-line plug connector is as follows:

First for a heatable fluid line to be connected to the fluid connector 7 (that is, a fluid line with electrical lines or heating lines), particularly SCR line 4, the electrical line to serve as a heating line is unwound, the fluid line is connected to and/or inserted into the fluid connector 7, depending upon construction of the fluid line. Next the fluid line is connected with the fluid connector 7, particularly with a material bond, for example by laser welding. Then the electrical line is wound around the fluid connector 7. In the next step, the electrical contact pins or contact sockets are inserted into the guide channels 9 of the spectacle component 8 and connected with it inside the guide channels 9, specifically being latched within the guide channels 9. The connection of the electrical line with the electrical contact pins or the electrical contact sockets can take place before or after insertion of the fluid connector 7 into the spectacle component 8. Next the fluid connector 7 is connected to the spectacle component 8 with a friction-fit and/or a form-fit, in particular being latched into the spectacle component 8. Then the spectacle component 8 is placed into the base component 5 and specifically latched with it. Preferably the fluid line connected to the fluid connector 7 is placed in a feed-through opening 42 of the base component 5. Finally the cover component 6 is placed on the base component 5 and connected with it, specifically latched to it. The cover component 6 can include a corresponding feed-through opening 42, see FIG. 4d.

In particular, for one of the plug components 2, 3, preferably for the male plug component 3, a cap is provided (not shown), which protectively covers the electrical connections 23, 24 and the mating area developed as a male fluid connection 35a or the receiving area of the female fluid connection 35b of the fluid connector 7. In particular, this cap is attached to the plug housing in such a way that it can be removed, specifically being latched. This cap can provide protective cover for the fluid connection 35, 35a, 35b, and the electrical connections 23, 24 when the unit is not in use or when one of the plug components 2, 3 is being mounted in a larger unit, for example in a car body. The connections are hereby protected from dirt and moisture when not in use.

In particular, the cap includes a narrowing along the coupling axis X, pointing away from the plug component 2, 3. The narrowing is preferably formed as a cone. Preferably a lateral surface of the cone-shaped narrowing extends with an angle of less than 45° to the coupling axis X.

The multi-line plug connector 1 according to the invention has the advantage that forces generated by, for example, the freezing of fluid within the connected fluid connectors 7a, 7b, are distributed equally on the components of the multi-line plug connector 1. The forces generated between the coupled fluid connectors 7a, 7b are thereby initially transferred to the spectacle component 8 and the cover component 6, which in turn transfer the force to the base component 5. Force is also transferred between the two plug components 2, 3. In particular, the components of the multi-line plug connector 1 transfer the forces generated by the fluid/ice to a retaining mechanism, which serves to securely latch the two plug components 2, 3 in their connected state. The retaining mechanism can be developed on the plug housings of the plug components 2, 3.

As each of the individual parts of the multi-line plug connector 1 can compensate for tensile and/or compression forces within the bounds of its tolerances, the multi-line plug connector 1 according to the invention can compensate for greater pressures than a multi-line plug connector with direct force transferal to the retaining mechanism. Consequently, the multi-line plug connector 1 absorbs elastic deformation forces, which can be generated for example by freezing pressure. For example, the multi-line plug connector 1 according to the invention can compensate for a volume expansion of the fluid within the fluid connector 7 of 10%. Depending upon the properties of the fluid, its volume expansion can take place at a temperature of −10° C. Likewise, the multi-line plug connector 1 according to the invention is designed such that it can absorb an internal fluid pressure of 150 bar and compensate by elastic deformation, for example contingent upon force transferal between the individual components as previously described.

The female electrical connections 24 extend cylindrically in particular on their outer circumference along the coupling axis X. The electrical contact sockets are thus specifically taken into the female electrical connections 24. Preferably the female electrical connections 24 are enclosed on their outer circumference by sealing elements 39. At the same time, the sealing elements 39 are tolerance compensation elements. For example, barrel-shaped sealing rings are provided which enclose the female electrical connections 24 over their outer circumference. In particular, the sealing elements 39 are affixed with a friction-fit on the outer circumference of the female electrical connections 24. The sealing elements 39 or tolerance compensation elements are preferably formed in such a way that they are ideal for bridging a gap which exists between the electrical connections 23, 24 in the connected state of the plug components 2, 3.

The sealing elements 39 form a torus according to a first possible design form; see FIGS. 7a, 7b, and 7c. In particular, the sealing elements 39 have an axial width along the coupling axis X such that they protrude beyond the ends of the female electrical connection 24 which face away from the guide channels 9 when they are in contact with the collar-shaped projections 21, see FIG. 6. In this way, the sealing elements 39 are compressed when the two plug components 2, 3 are coupled.

An alternate design form provides that the sealing elements 39 include a diaphragm which stretches completely over the inlet opening 51 of the female electrical connection 24 for coupling with the electrical contact pin of the male electrical connection 23 (not shown). Preferably the diaphragm is designed in such a way that the electrical contact pin of the male electrical connection 23 can be pushed through the diaphragm along the coupling axis X and that after removing the electrical contact pin of the male electrical connection 23, the diaphragm seals the inlet opening 51 of the female electrical connection 24 against fluids. In this way, the diaphragm particularly seals against fluids at least such that the electrical contacts of the electrical connections 23, 24 are protected at least against splashing water both in their separated state as well as in their connected state. Preferably, the diaphragm is formed as one piece with the sealing element 39.

According to a third possible design form of the sealing elements 39, they have a unilaterally closed surface 50 (see FIGS. 7d to 7i) which stretches over an inlet opening 51 of the female electrical connection 24, which is provided for insertion of a single electrical contact pin of the male electrical connection 23. In particular, the sealing element 39 has a hole 46 on the surface, see FIGS. 7d to 7i, whose cross-section perpendicular to the coupling axis X is smaller than or equal to the cross-section of the electrical contact pin of the male electrical connection 23 perpendicular to the coupling axis X.

In particular, the compression of the sealing element 39 is achieved through abutting contact of the radial collar-shaped projections 21 of the female electrical connections 24 and abutting contact on the corresponding male electrical connection 23. In this case, the sealing elements 39, preferably the barrel-shaped sealing rings, for example their material, are developed in such a way that the sealing elements 39 can absorb a clamping force acting axially to the coupling axis X between the two plug components 2, 3 in a range of 10 N to 20 N. In particular, the sealing elements 39, preferably the barrel-shaped sealing rings, generate an opposing clamping force axially to the coupling axis X such that the two plug components 2, 3 are connected to one another without any play in their connected state. This has the advantage that axial movement along the coupling axis X between the electrical contact pins and the electrical contact sockets is prevented, so that they cannot rub together. This in turn prevents sparking between the electrical contacts and other damages caused by rubbing of the contacts. Preferably the sealing elements 39, especially preferably the barrel-shaped sealing rings, are formed in such a way that they seal against fluids at a fluid pressure of 0.05 bar. In this way, the electrical contacts, that is the contact pins and the contact sockets, are protected from fluid from the fluid connector 7 when the plug components 2, 3 are pulled apart.

It is preferable that the sealing elements 39, especially preferably the barrel-shaped sealing rings, narrow at their opposing ends mirror-symmetrically to a radial axis which is perpendicular to the coupling axis X. This has the advantage of avoiding a gap extrusion upon pressing the sealing elements 39 together.

The sealing elements 39, especially the barrel-shaped sealing rings, have the advantage that the female electrical connections 24 which are received within the male electrical connections 23 are always protectively encapsulated, even when forces caused by freezing of the fluid push the electrical connections 23, 24 apart. This prevents the ingress of fluid and thereby also prevents the associated sparking. The compressability of the sealing elements 39, particularly the barrel-shaped sealing rings, ensures that a mating path is present upon insertion of the male plug component 3 into the female plug component 2, so that the male plug component 3 can be connected to the female plug component 2 by way of a latching connection with a mating path.

Figure 11A:
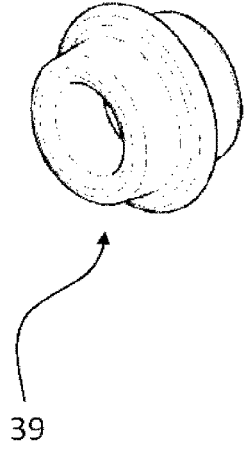
FIG. 11b shows an end view of the fourth design example of the sealing element.
FIG. 11c shows a cross-section through the sealing element according to the fourth design example generally along line M-M in FIG. 11b.
Figure 11B:
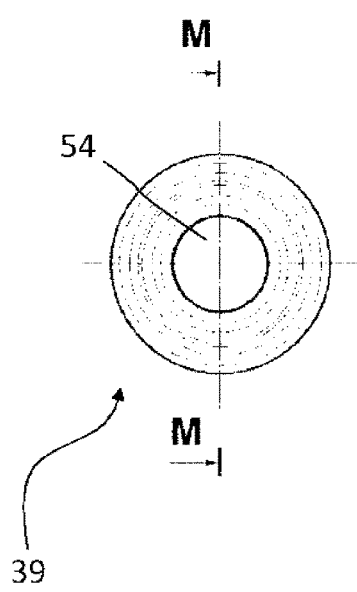
Figure 11C:
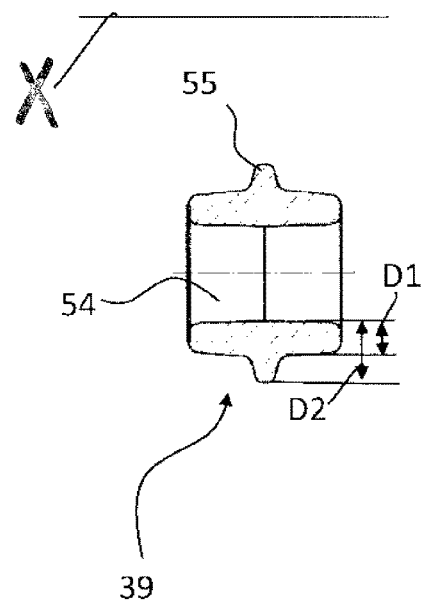

According to a fourth design form of the sealing element 39, which is shown in FIGS. 11a to 11c, the sealing element 39 is torus-shaped, see FIG. 11c, and includes a feed-through opening 54 which runs along the coupling axis X. The sealing element 39 preferably includes a ring-shaped annular projection 55 on its outer circumference of the outer wall facing away from the feed-through opening 54, which circumferentially encloses the sealing element 39 in relation to the coupling axis X. In particular, the annular projection 55 is formed in such a way that it bridges a radial gap between the spectacle component 8 and the sealing element 39. In this way, in particular a radial gap between the spectacle component 8 and the sealing element 39 is securely sealed. Thus the sealing element 39 according to this preferred design form can seal radially without or with only low axial compression as well as seal axially to the coupling axis X through axial compression.

The sealing element 39 preferably includes a ⅔ to ¾ larger radial thickness with respect to the coupling axis X in the region of the annular projection 55 compared to a thickness D1 of the sealing element 39 in a region outside the annular projection. In particular the annular projection 55 surrounds the sealing element 39 axially centrally with respect to the coupling axis X.

The female plug component 2 preferably has a collar 40 extending axially to the coupling axis X and circumferentially over the mating area 35, 36 of the fluid connector 7 and over the electrical connections 23, 24 (see for example FIG. 5). The length by which the collar 40 extends over the electrical connections 23, 24 of the female plug component 2 in the direction of the coupling axis X is, for example, proportional to the length of the electrical contact pins of the male electrical connections 23. Using this collar 40, the male plug component 3 can be inserted into the female plug component 2 which includes the collar 40 at a specific angle of tilt. In particular, the tilt angle in relation to the coupling axis X can be no more than 8°, especially no more than 4°. This ensures mating security for the electrical contacts, that is, the electrical contacts cannot be joined together at an angle in the process of joining the two plug components 2, 3 into their connected state.

The collar 40 can include contours on its inner circumference for guiding the male plug component 3 during the process of inserting the male plug component into the female plug component 2. This ensures that the male plug component 3 cannot tip in relation to the coupling axis X upon insertion into the female plug component 2. For example, the male plug component 3 can include guide grooves on its outer circumference which engage with guide bars on the inner circumference of the collar 40 upon insertion of the male plug component 3 into the female plug component 2.

Preferably the female plug component 2 surrounds the male electrical connections 23, and the male plug component 3 surrounds the female electrical connections 24.

Especially preferably the female plug component 2 surrounds the receiving area 36 of the female fluid connector 7b and the male plug component 3 surrounds the mating area 35 of the male fluid connector 7a, which enters into the receiving area 36 of the female fluid connector 7b upon joining the plug components 2, 3.

When the components of the multi-line plug connector 1 are manufactured with an injection molding process, the inlet opening 51 in the guide channels 9 of the spectacle component 8 is larger than the electrical contact socket of the female electrical connection 24 into which the contact pins of the male electrical connection is to be inserted. As is illustrated in FIG. 2b, for example, the window 48 is located adjacent to a duct 47 of the guide channel 9 which terminates in the inlet opening 51 for insertion and connection of the electrical contact socket. The electrical contact pin to be inserted into the electrical contact socket is preferably crimped to the electrical line for electrical contact. The electrical contact socket can also be crimped to the electrical line. The electrical contact pins in particular run obliquely to the coupling axis X, preferably with an angle of no more than 8°, especially preferably with an angle of no more than 4° to the coupling axis X. This inclination of the electrical contact pins or contact sockets results from their manufacture, as between the electrical lines and the electrical contacts there is a nearly unformed area.

The possibility of misalignment of the electrical contacts, that is insertion of the electrical contact pin into the window 48 to the side of the electrical contact socket, can be reduced in that, upon joining the plug components 2, 3 into their connected state with a distance between the two plug components 2, 3, in which the collar 40 of the female plug component 2 receives the electrical connections 23, 24 of the male plug component 3, the electrical contact pins and the window 48 are radially offset to one another, especially by 180°, on a cylindrical circumferential jacket in relation to a central axis through the middle of the electrical contact socket of the female electrical connection 24, particularly through the middle of the inlet opening 51 of the electrical contact socket. The electrical contact pins, which can then only touch one wall of the respective female electrical connection 24 when being inserted, are thus guided into the electrical contact socket by this wall. Correspondingly, for example dependent upon the design of the electrical connections 23, 24 and/or the guide channels 9 of the spectacle component 8, the electrical contact pins in the connected state of the plug components 2, 3 can act upon the electrical contact sockets with a mechanical counter-force in a direction which is offset by 180° from the duct 47 of the female electrical connection 24 in a circumferential circle around the coupling axis X.

The possibility of misalignment of the electrical contacts can be further reduced when the multi-line plug connector 1 is designed as a poka-yoke plug connector, which means that the plug components 2, 3 can only be inserted into one another in one predetermined orientation. Especially in the case of a poka-yoke plug connector, guide grooves 53a, 53b and/or guide ribs 52a, 52b which correspond in their form are provided on the outer diameter of the male plug component 3 and on the inner diameter of the female plug component 2, which upon insertion of the male plug component 3 into the female plug component 2 guide the former into the female plug component 2 and only permit tilting in one direction in relation to the coupling axis X. It can thus be provided that the electrical contact sockets of the female electrical connections 24 are located in such a way that the electrical contact pins are guided in the direction of the electrical contact sockets and not into the area of the enlarged inlet opening 51 upon tilting the male plug component 3, that is, not in the direction of the window 48.

Figure 10A:
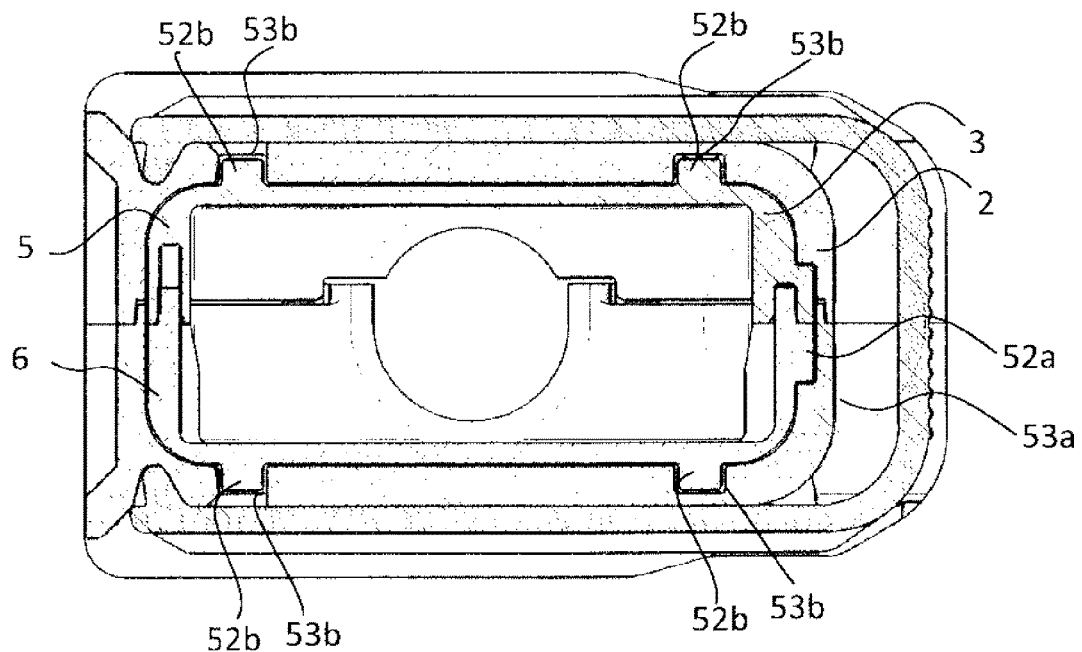
FIG. 10a shows a cross-section perpendicular to the coupling axis of a multi-line plug connector in a connected state.
Figure 10B:
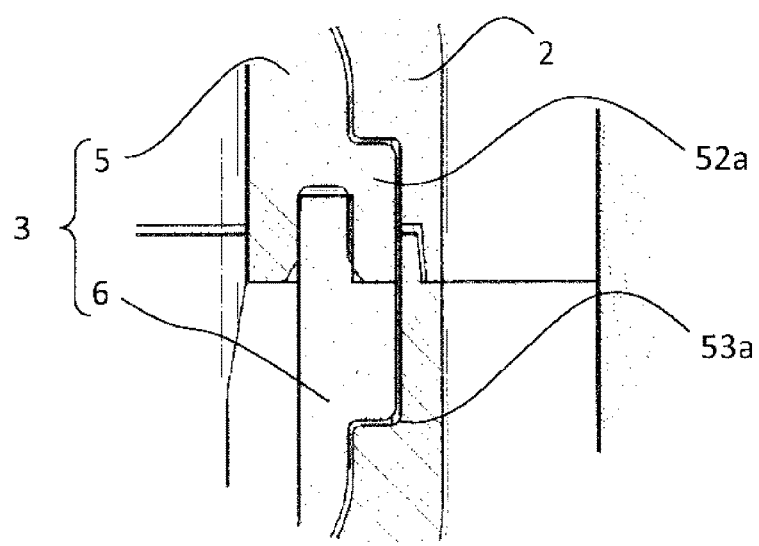
FIG. 10b shows an enlarged portion of the multi-line plug connector according to FIG. 10a, FIG. 11a shows a perspective view of a fourth design example of the sealing element.

In a preferred design form of a poka-yoke plug connector, the male and the female plug component 2 include a single guide rib 52a which runs parallel to the coupling axis X and a single corresponding guide groove 53a correspondingly suited to the first guide rib 52a, also running along the coupling axis X. A potential design example is shown in FIGS. 10a and 10b. In particular, the first guide rib 52a is formed on the male plug component 3 and the first guide groove 53a is formed on the female plug component 2. The first guide rib 52a and/or the first guide groove 53a preferably run along a connecting section of the respective plug component 2, 3, on which the base component 5 is connected with the cover component 6.

According to the design example in FIG. 10a, an additional second guide rib 52b and a second guide groove 53b are preferably formed on the plug components 2, 3. These second guide ribs 52*a* and guide grooves 53*b* are specifically distributed on an outer housing of the male plug component 3 and an inner housing of the female plug component 2 with equal spacing to one another, and are arranged with mirror symmetry in relation to a plane running through the coupling axis X. The second guide ribs 52*b* and guide grooves 53*b* favor insertion of the plug components 2, 3 without tilting upon joining.

In summary, it should be clarified that the previously described features of the multi-line plug connector 1 which were only described for one of the two plug components 2, 3, either in conjunction with the female plug component 2 or in conjunction with the male plug component 3, can be developed equally for the respective counterpart plug component 2, 3.

Furthermore, the invention presented is based on the premise that the multi-line plug connector 1 is affixed within a mounting bracket. This mounting bracket has one or more contour/s which is/are adapted to the outer contour of the multi-line plug connector, and/or retaining implements for the multi-line plug connector 1. Thus a secure mounting and an increased protection against ice pressure are effected. Furthermore, the contour/s present in the mounting bracket can be configured such that it is impossible to open any mounting clamp when the multi-line plug connector 1 is in its installed state in the bracket.

The invention is not limited to the depicted and described design examples, but rather encompasses all designs of equivalent function in the sense of the invention. It is explicitly noted that the design examples are not limited to all individual features in combination, but rather each individual feature can be meaningful to the invention independent of all other individual features. Furthermore, the invention has hitherto not been restricted to the combination of features as described in claim 1, but rather can also be defined by any other desired combination of features out of all of the features described in total. This means that in essence practically every individual feature of claim 1 can be omitted or replaced by at least one other feature described elsewhere in this application.

The invention claimed is:

1. A multi-line plug connector for connecting two heated fluid lines and at least two electrical lines by way of a single connecting operation, the multi-line plug connector comprising a female plug component connected with a male plug component and which can be decoupled along a coupling axis when the plug components are in a connected state, whereby each plug component includes a fluid connection and two electrical connections;
wherein each of the female and male plug components includes a two-part plug housing made up of a base component and a cover component connected to one another and enclosing an inner space in which a spectacle component is contained, wherein each spectacle component includes two guide channels extending along the coupling axis and having electrical connections for accepting electrical lines and the electrical connectors on ends thereof, and the guide channels being connected with one another by way of at least one bridge wherein the bridge is connected to a latching mechanism of the base component protruding into the inner space by at least one of a friction-fit or a form fit securing the spectacle component on the base component against displacement along and/or crosswise to the coupling axis.

2. The multi-line plug connector according to claim 1, wherein each spectacle component incorporates a fluid connector, tubular in shape, which is connected with the spectacle component by at least one of a friction-fit or a form-fit prevent displacement along the coupling axis, wherein the fluid connector includes a connecting component on one end for connection to the heated fluid line, and a respective fluid connection is formed on an end of the fluid connector opposite the connecting component.

3. The multi-line plug connector according to claim 1, wherein each spectacle component is secured to at least one of the base component or the cover component with a form-fit in an area of the electrical connections to protect against displacement along the coupling axis.

4. The multi-line plug connector according to claim 1, wherein one of the plug components has a collar which extends circumferentially and axially to the coupling axis over the fluid connection and the electrical connections, the collar limiting the other of the plug components to being inserted into the plug component having the collar at a predetermined angle of inclination of no more than 8° to the coupling axis.

5. The multi-line plug connector according to claim 1, wherein the fluid connector includes means for transferring forces generated between the plug components by fluid pressure or ice pressure to the spectacle component and the cover component when the plug components are in their connected state, the spectacle component and the cover component include means for transferring the force to the base component.

6. The multi-line plug connector according to claim 1, wherein the fluid connector, the spectacle component, the cover component, and the base component of each plug component include means for transferring forces generated by fluid pressure or ice pressure to a retaining mechanism for latching of the female plug component and the male plug component in their connected state.

7. The multi-line plug connector according to wherein 1, wherein the fluid connector, the spectacle component, the cover component, and the base component of each plug component in the plug components' connected position include means for compensating for a volume expansion of the fluid within the fluid connector in a range between 8% and 15% and/or compensating for an interior pressure of the fluid in a range between 100 bar to 200 bar.

8. The multi-line plug connector according to claim 1, wherein the guide channels are connected with one another by two bridges running parallel, whereby a cross-bar stretches along the coupling axis and connects the two bridges with one another centrally between the two guide channels forming two openings on the spectacle component between the cross-bar and the guide channels on both sides of the cross-bar, two protrusions of the base component engage in the openings with a form-fit.

9. The multi-line plug connector according to claim 1, wherein each the guide channel is secured to at least one of the base component or the cover component with form-fit in an area of the electrical connection to protect against displacement along the coupling axis.

10. The multi-line plug connector according to claim 1, wherein the fluid connector receives a projection of the spectacle component in an indentation formed on an outer circumference of the fluid connector and receives a retaining collar of the cover component on the outer circumference, which the retaining collar engaging with a groove of the fluid connector that is in a radially offset position on an outer circumference of the fluid connector in relation to the indentation of the fluid connector by 180°.

11. The multi-line plug connector according to claim 1, wherein the fluid connector is secured on the spectacle component against longitudinal displacement along the coupling axis by a clamping arm on the spectacle component which wraps circumferentially around the fluid connector with a circumferential angle greater than or equal to 180°.

12. The multi-line plug connector according to claim 1, wherein one of the plug components includes a single first guide rib which extends parallel to the coupling axis and the other plug component includes a single first guide groove which corresponds to the first guide rib and extends along the coupling axis.

13. The multi-line plug connector according to claim 12, wherein the first guide rib and/or the first guide groove run along a connecting section of the respective plug component, on which the base component is connected with the cover component.

14. The multi-line plug connector according to claim 1, wherein the spectacle component includes a collar-shaped projection on each of its guide channels in the area of the electrical connection, which lies on an outer wall of at least one of the base component or the cover component.

15. The multi-line plug connector according to claim 14, wherein one of the plug components includes two female electrical connections each with an electrical contact socket extending along the coupling axis, which in the connected state of both plug components each receive an electrical contact pin of a male electrical connection of the other plug component.

16. The multi-line plug connector according to claim 15, wherein the male electrical connection includes a hollow cylindrical receiving body which completely receives the electrical contact socket of the female electrical connection when the plug components are in their connected state.

17. The multi-line plug connector according to claim 15, wherein the electrical contact pin of the male electrical connection encloses an acute angle in a range of 1° to 4° in relation to the coupling axis.

18. The multi-line plug connector according to claim 15, wherein a window located at the electrical contact socket and the electrical contact pin upon joining the plug components are located to each other such that in the event of an inclined position of the electrical contact pins in relation to the electrical contact socket resulting from the manufacturing process in a range of 4° to 8° in relation to the coupling axis, secure mating of the electrical contacts is ensured.

19. The multi-line plug connector according to claim 18, wherein when joining the plug components in their connected state with separation between the two plug components, wherein the collar of the female plug component receives the electrical connections of the male plug component, each window of the electrical contact socket of the female electrical connection is radially offset by 180° to the electrical contact pins of the male plug component to be inserted into the electrical contact socket on a cylindrical circumferential jacket in relation to a central axis running through the middle of the electrical contact socket of the female electrical connection, and through a central axis running through the middle of an inlet opening of the electrical contact socket for insertion of the electrical contact pin of the male electrical connection.

20. The multi-line plug connector according to claim 15, wherein the female electrical connection is surrounded by a sealing element on its outer circumference, whereby the sealing element is affixed to the outer circumference of the female electrical connection by at least one of a friction-fit or form-fit.

21. The multi-line plug connector according to claim 20, wherein the sealing element exhibits a width along the coupling axis such that it protrudes axially along the coupling axis over the electrical contact socket of the female electrical connection when lying against the collar-shaped protrusion, and the sealing element lies in contact with the collar-shaped protrusion of the female electrical connection and the respective male electrical connection with a clamping force acting axially long the coupling axis when the plug components are in their connected state.

22. The multi-line plug connector according to claim 20, wherein the sealing element is formed in such a way that it absorbs configured to absorb axial tension along the coupling axis between the two plug components in a range of 10 N to 20 N.

23. The multi-line plug connector according to claim 20, wherein the sealing element is configured to create an opposing axial tension along the coupling axis such that the two plug components are connected to one another without play in their connected state.

24. The multi-line plug connector according to claim 20, characterized in that wherein the sealing element extends along the coupling axis in a hollow cylindrical shape, wherein a jacket of the hollow cylindrical sealing element exhibits maximum thickness in its axial center.

25. The multi-line plug connector according to claim 20, wherein the sealing element is toroidal in shape.

26. The multi-line plug connector according to claim 20, wherein the sealing element includes a diaphragm which stretches completely over the inlet opening of the female electrical connection for coupling with the electrical contact pin of the male electrical connection, whereby the diaphragm is configured such a way that the electrical contact pin of the male electrical connection can be pushed through the diaphragm along the coupling axis and that after removing the electrical contact pin of the male electrical connection, the diaphragm seals the inlet opening of the female electrical connection against fluids.

27. The multi-line plug connector according to claim 20, wherein the sealing element includes a surface which is closed on one side up to a hole for feeding the electrical contact pin of the male electrical connection through, which extends over an inlet opening of the female electrical connection for inserting the electrical contact pin of the male electrical connection, whereby the cross-section of the hole perpendicular to the coupling axis is smaller than or equal to the cross-section of the electrical contact pin of the male electrical connection.

28. The multi-line plug connector according to claim 20, wherein the sealing element contacts the radial collar-shaped projection of the female electrical connection and the male electrical connection, on a front area of a hollow cylindrical receiving body of the male electrical connection and is fluid-tight at a fluid pressure of 0.05 bar when the plug components are in their connected state.

29. The multi-line plug connector according to claim 20, wherein the sealing element includes a ring-shaped annular projection on its outer surface, which surrounds the sealing element along its whole circumference with respect to the coupling axis, the annular projection bridging a radial gap between the spectacle component and the sealing element.

* * * * *

UNITED STATES PATENT AND TRADEMARK OFFICE
CERTIFICATE OF CORRECTION

PATENT NO. : 10,403,997 B2  
APPLICATION NO. : 16/083396  
DATED : September 3, 2019  
INVENTOR(S) : Thomas Birkholz et al.

Page 1 of 1

It is certified that error appears in the above-identified patent and that said Letters Patent is hereby corrected as shown below:

In the Claims

At Column 16, Claim 10, Line number 66 should read "the retaining collar engaging with a groove of the"

At Column 18, Claim 24, Line number 26 should read "wherein the sealing element extends"

Signed and Sealed this  
Thirty-first Day of March, 2020

Andrei Iancu  
*Director of the United States Patent and Trademark Office*